(12) United States Patent
Werkheiser et al.

(10) Patent No.: US 11,573,918 B1
(45) Date of Patent: Feb. 7, 2023

(54) METHODS AND APPARATUS FOR COMMUNICATING BETWEEN NODE DEVICES

(71) Applicant: Arm Limited, Cambridge (GB)

(72) Inventors: Mark David Werkheiser, Austin, TX (US); Sai Kumar Marri, Austin, TX (US); Lauren Elise Guckert, Austin, TX (US); Gurunath Ramagiri, Austin, TX (US); Jamshed Jalal, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/380,112

(22) Filed: Jul. 20, 2021

(51) Int. Cl.
*G06F 13/14* (2006.01)
*G06F 13/40* (2006.01)

(52) U.S. Cl.
CPC ................................. *G06F 13/404* (2013.01)

(58) Field of Classification Search
None
See application file for complete search history.

(56) References Cited

U.S. PATENT DOCUMENTS

| | | | |
|---|---|---|---|
| 2005/0193084 A1* | 9/2005 | Todd | G06F 3/0635 709/214 |
| 2016/0004449 A1* | 1/2016 | Lakshman | G06F 3/0604 711/162 |
| 2020/0084269 A1* | 3/2020 | Husar | H04L 67/1023 |
| 2022/0067693 A1* | 3/2022 | Venkatapathy | G06Q 20/3223 |

\* cited by examiner

*Primary Examiner* — Henry Tsai
*Assistant Examiner* — Dean Phan
(74) *Attorney, Agent, or Firm* — Nixon & Vanderhye P.C.

(57) ABSTRACT

Aspects of the present disclosure relate to an interconnect comprising interfaces to communicate with respective requester and receiver node devices, and home nodes. Each home node is configured to: receive requests from one or more requester nodes, each request comprising a target address corresponding to a target receiver nodes; and transmit each said request to the corresponding target receiver node. Mapping circuitry is configured to: associate each of said plurality of home nodes with a given home node cluster; perform a first hashing of the target address of a given request, to determine a target cluster; perform a second hashing of the target address, to determine a target home node within said target cluster; and direct the given message, to the target home node.

20 Claims, 4 Drawing Sheets

METHODS AND APPARATUS FOR COMMUNICATING BETWEEN NODE DEVICES

BACKGROUND

The present technique relates to the field of interconnects for providing communications between node devices.

Such nodes may be conceptually termed "requester nodes", which issue requests, and "receiver nodes", which receive the requests. For example, a requester node may be a processor or other processing circuitry, which issues a request for data from a storage such as a memory. The storage can thus be considered a receiver node. The "requester" and "receiver" status may be contextual and/or specific to a particular interaction. For example, a node which issued a request to a node (and thus acted as a requester) may subsequently receive a request from a different node (and thus act as a receiver).

A plurality of nodes can be connected via an interconnect, for example with each node separately connected to the interconnect such that all inter-node communications travel via the interconnect. This allows customisability and extensibility of the system, as nodes can be added and removed depending on operating requirements. However, the performance of the interconnect can be a bottleneck to the performance of the whole system.

There is thus a desire for improved interconnects.

SUMMARY

At least some examples provide an interconnect apparatus comprising:

a first plurality of interfaces to communicate with respective requester node devices;

a second plurality of interfaces to communicate with respective receiver node devices;

a plurality of home nodes, each home node being configured to:
  receive requests from one or more requester node devices via respective interfaces of the first plurality, each request comprising a target address corresponding to a target receiver node device of said second plurality; and
  transmit each said request to the corresponding target receiver node device via the respective interface of the second plurality, and mapping circuitry to:
associate each of said plurality of home nodes with a given home node cluster of one or more home node clusters;
perform a first hashing of the target address of a given request, received at an interface of the first plurality, to determine a target cluster of said one or more home node clusters;
perform a second hashing of the target address, to determine a target home node within said target cluster; and
direct the given message, from said interface of the first plurality, to the target home node.

Further examples provide a system comprising:
a first plurality of requester node devices;
a second plurality of receiver node devices, wherein the requester node devices are configured to transmit requests, each request comprising a target address corresponding to a target receiver node device of said second plurality; and
an interconnect device, communicatively coupled to the first plurality of requester node devices and to the second plurality of receiver node devices, the interconnect device comprising:
  a plurality of home nodes, each home node being configured to:
    receive requests from one or more requester node devices; and
    transmit each said request to the corresponding target receiver node device via the respective interface of the second plurality, and mapping circuitry to:
    associate each of said plurality of home nodes with a given home node cluster of one or more home node clusters;
    perform a first hashing of the target address of a given request, to determine a target cluster of said one or more home node clusters;
    perform a second hashing of the target address, to determine a target home node within said target cluster; and
    direct the given message to the target home node.

Further examples provide a method comprising:
receiving a request from a home node device, said request being directed to a target receiver node device and comprising a target address associated with the receiver node device;
performing a first hashing of the target address, to determine a target cluster of a plurality of clusters of home nodes;
performing a second hashing of the target address, to determine a target home node within said target cluster;
directing the given message to the target home node; and
transmitting the given message from the target home node to the target receiver node device.

Further aspects, features and advantages of the present technique will be apparent from the following description of examples, which is to be read in conjunction with the accompanying drawings.

DESCRIPTION OF EXAMPLES

Figure 1:
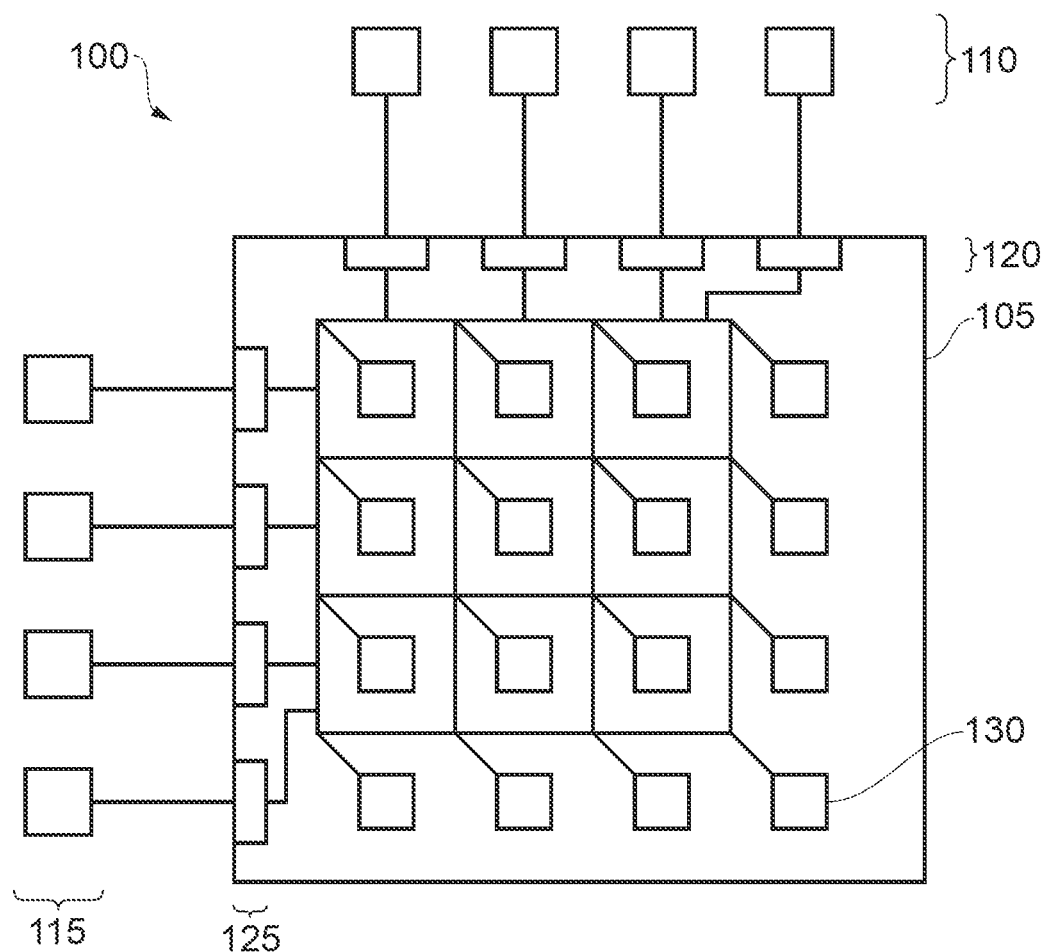
FIG. 1 schematically depicts a system according to an example.

As set out above, examples of the present disclosure provide an interconnect apparatus. The apparatus comprises interfaces for communication with nodes: a first plurality of interfaces are configured to communicate with respective requester node devices, and a second plurality of interfaces are configured to communicate with respective receiver node devices. As explained above, the status of a given node as "requester" or "receiver" may be context-specific. One or more of the transmitter nodes may comprise processing circuitry. Alternatively or additionally, one or more of the receiver nodes may comprise a storage, for example a memory node. Requests from the requester nodes to the receiver nodes may thus be requests for data stored in the memory nodes.

The interconnect apparatus comprises a plurality of home nodes. Each home node is configured to receive requests from one or more requester node devices via the respective associated interfaces. Each such request comprises a target address corresponding to a target receiver node device. The home nodes are configured to transmit each received request to the corresponding target receiver node device, via the respective interface. The home nodes thus facilitate communication between requester nodes and receiver nodes. Particular nodes (e.g. particular receiver nodes) may be allocated to particular home nodes, such that each home node handles traffic to its corresponding receiver node(s). Each home node may have an associated cache, or other storage to store temporary copies of data.

In order to allow such an allocation, the interconnect apparatus further comprises mapping circuitry. The mapping circuitry is configured to associate each home node with a given home node cluster. There may be one or more home node clusters in a particular implementation of the present example.

The mapping circuitry is configured to perform a first hashing of the target address of a given request, to determine an appropriate target cluster of said one or more home node clusters. This hashing may be skipped (saving computational operations) if the number of clusters is equal to 1. The mapping circuitry further performs a second hashing of the target address, to determine a target home node within said target cluster. For example, the mapping circuitry may be configured to associate each of said receiver node devices with a given home node cluster of said one or more home node clusters; said target cluster is the cluster associated with the target receiver node device of the given request.

The given request is then directed, by the mapping circuitry, from the interface (of the first plurality) at which it is received, to the target home node.

This two-level hashing provides an efficient way of configuring an interconnect to handle data traffic. In particular, it allows a relatively even distribution of receiver nodes across the home nodes, for example by having a power-of-two number of home node clusters (where the integer can be 1). This allows the number of home nodes to be arbitrary, as well as being scalable and configurable. This improves the flexibility of the system (whilst maintaining performance), especially versus comparative examples in which the number of home nodes must be a power of 2 to ensure even distribution. The present system thus combines the advantages of comparative systems in which all nodes are mapped to all home nodes (flexible, but inefficient) with the advantages of comparative systems in which the number of home nodes is forced to be a power of 2 (computationally efficient, but inflexible), whilst also being more scalable than either of these comparative systems.

In examples, an equal number of home nodes is associated with each cluster. This allows maximally even distribution of receiver node addresses across the home nodes, in particular in combination with an integer-power-of-2 number of home nodes.

The number of clusters may be selected based on the number of receiver nodes at a given time. This allows the number of clusters to be selected (at system configuration, or on the fly as nodes are added or removed) in order to maximise performance. For example, the number of clusters may be selected to localize network traffic to the receiver node devices. As another example, the number of clusters may be determined based on the number of receiver nodes. For example, the number of clusters may be equal to the number of receiver nodes (such that each receiver node is assigned its own cluster). More generally, the number of clusters may be an integer multiple of the number of receiver nodes such that the addresses of a given receiver node are split across multiple clusters, or a fraction of the number of receiver nodes, such that multiple receiver nodes share a single cluster. These provide various ways of configuring the clusters, such that performance can be optimised in a particular system.

In an example, the mapping circuitry is configured to perform the first hashing as a log 2(C)-bit hash of the target address, where C is the number of clusters of said one or more home node clusters. As explained in more detail below, the address distribution across the clusters can be configured to allow such a hashing to extract the appropriate cluster identity, providing a computationally efficient way of determining the correct cluster.

Alternatively or additionally, the mapping circuitry may be configured to, prior to performing the second hashing, correct the target address for bias associated with the first hashing. In some examples, if this is not done, holes may be introduced in caches of the home nodes and/or in memory (e.g. when each receiver node is a memory, such as a Dynamic Random Access Memory DRAM). Such bias correction thus maximises efficiency and corresponding computational performance.

This bias correction may comprise removing one or more bits from the target address. For example, log 2(C) bits may be removed, where C is the number of clusters of said one or more home node clusters. Bits may be selected for removal based on at least one of the number of clusters, and a storage element size (for example a cache line size) associated with the apparatus. As an example, said removing may comprise selecting a least significant bit based on the storage element size, selecting a most significant bit based on the number of clusters, and removing the bits from the most significant bit to the least significant bit (inclusive). This could be expressed as [MSB:LSB]=[log 2(cache line size)+log 2(number of clusters)−1: log 2(cache line size)]. This provides an effective way of correcting the bias which may arise from the above-described first hashing.

Examples of the present disclosure will now be described with reference to the drawings.

FIG. 1 schematically shows a system 100 according to an example. The system 100 comprises an interconnect 105, requester node devices 110, and receiver node devices 115. The requester nodes 110 may for example be processing devices such as processors or processor cores, and the receiver nodes 115 may be storage nodes such as memory devices, for example dynamic random access memory (DRAM) devices.

The requester nodes 110 are connected to the interconnect 105 via interfaces 120. Similarly, the receiver nodes 115 are connected to the interconnect 105 via interfaces 125. Thus, the requester nodes 110 are indirectly connected to the receiver nodes 115, via the interconnect 105.

The requester nodes issue requests, each of which is to be services by a given receiver node. For example, if the receiver nodes 115 are storage nodes, an overall memory address space may be distributed across the receiver nodes 115. A given request may then identify such an address, such that it should be forwarded to the appropriate receiver node 115. Alternatively or additionally, a request may specifically identify the receiver node by which it is to be serviced.

The interconnect 105 comprises a number of home nodes 130. The home nodes are communicatively coupled to the interfaces 120, 125 via a mesh of connections, and are configured to receive requests from interfaces 120 and distribute each request to the interface 125 of the appropriate receiver node 115. In some systems, each home node 130 can direct requests to any of the receiver nodes 115. However, in examples of the present disclosure, particular receiver nodes 115 can be associated with particular home nodes, or clusters of home nodes, such that each home node 130 specifically processes requests for receiver nodes 115 with which it is associated. This can advantageously improve system performance, as described in more detail below.

Each home node may comprise a temporary storage such as a cache, such that frequently-requested data can be served directly from the home node.

Figure 2:
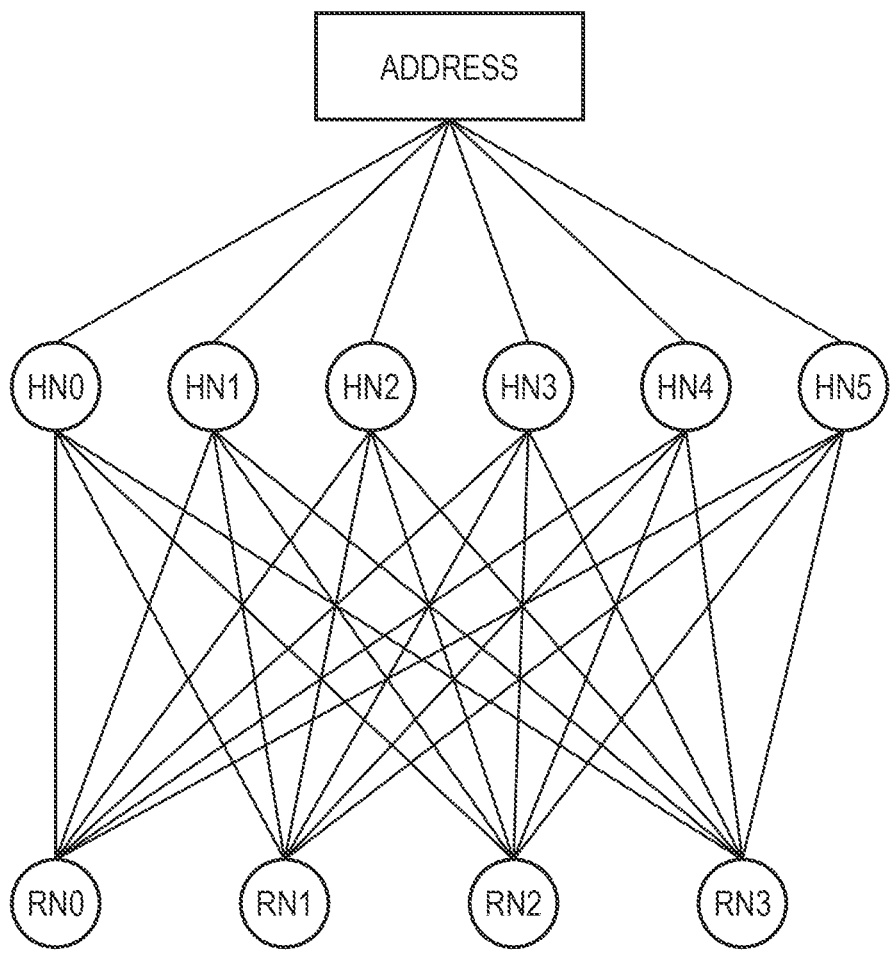
FIG. 2 depicts a memory address allocation scheme according to a comparative example.

FIG. 2 depicts an allocation of memory addresses within a comparative example which does not implement aspects of the present disclosure. In this example, requester and receiver nodes are connected via an interconnect in the manner of FIG. 1. The interconnect, in this comparative example, comprises 6 home nodes HN0-HN5 and 4 receiver nodes RN0-RN3. Addresses are distributed across the receiver nodes, such that each receiver node stores data having addresses within a specified range.

In this example, any request can be handled by any home node. Thus, each home node must be configured to handle a request relating to any address, and so each of the 6 home nodes is configured to direct requests to each of the 4 receiver nodes. This configuration can lead to high congestion of traffic within the interconnect, in particular when a relatively high number of requests is to be processed. It is also poorly scalable: the congestion becomes significantly worse when additional receiver nodes (or additional requester nodes) are added.

This congestion may be alleviated by way of a hashing scheme to distribute memory addresses between the home nodes, such that each home node can handle a subset of the addresses. One way in which this could be done is to use a log 2(n)-bits hash on the address to determine a home node, where n is the number of home nodes. However, this only leads to an even distribution of addresses if the number of home nodes is a power of 2. In other systems, such as that of FIG. 2 (with 6 home nodes), a hashing scheme such as this can lead to uneven distribution of addresses, or lead to holes in the memory space (or in the caches of the home nodes, in systems in which these are implemented), significantly reducing efficiency.

By way of example, a 3-bit address hash for calculating a target home node in such a comparative example, where the address is A, could be:

target[2:0]=$A[47:45]\^A[44:42]\^ \ldots \^A[11:9]\^A[8:6]$

This implicitly assumes the existence of home node targets 6 and 7. If, for example, these were mapped to home nodes HN0 and HN1 in FIG. 2 (to ensure that each address can be handled), the address space would be distributed across home nodes HN0-HN5 as follows:

| Home node | % of addresses |
|---|---|
| HN0 | 25% |
| HN1 | 25% |
| HN2 | 12.5% |
| HN3 | 12.5% |
| HN4 | 12.5% |
| HN5 | 12.5% |

This uneven distribution leads to inefficient memory access, and inefficient usage of home node caches, thereby decreasing the rate at which the interconnect can service requests.

Figure 3:
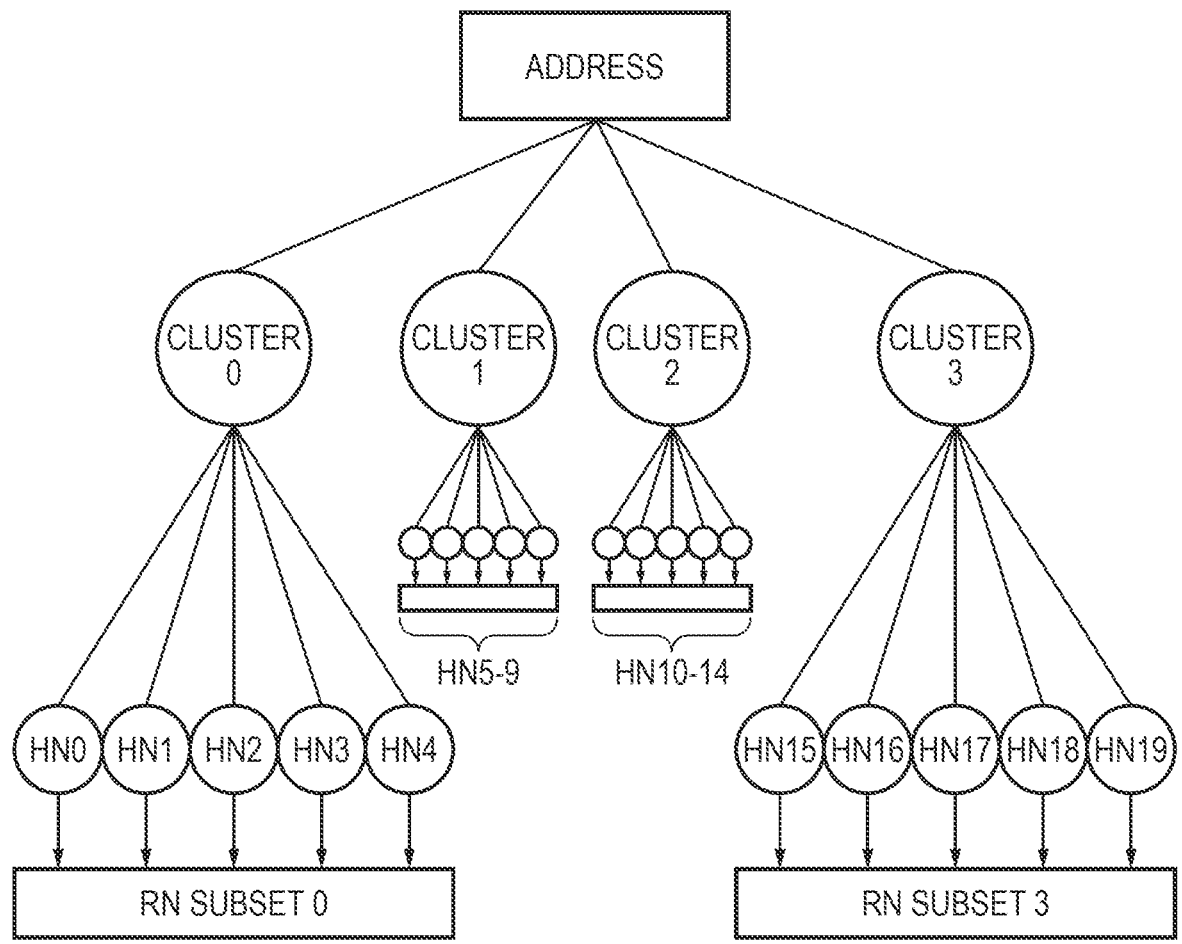
FIG. 3 depicts an example memory address allocation scheme.

FIG. 3 schematically depicts an allocation of memory addresses according to an example of the present disclosure, which improves upon the aforementioned issues.

In this example, requester and receiver nodes are connected via an interconnect as described above with reference to FIG. 1. The interconnect, in this example, comprises 20 home nodes HN0-HN19, and a number of receiver nodes RN.

Addresses are allocated to home nodes according to a two-level hierarchical hashing scheme, in which the first level hashing of an address identifies a particular cluster of home nodes, and the second level identifies a particular home node within that cluster.

In this example, 4 clusters of home nodes (cluster 0-cluster 3) each contain 5 home nodes. In particular cluster 0 contains home nodes HN0-HN4, clusters 1 and 2 are not shown in detail (in the interests of not over-complicating the diagram), and cluster 3 contains home nodes HN15-HN19. Each cluster of home nodes can be allocated to a (exclusive) subset of receiver nodes. This is shown in FIG. 3, where the nodes of clusters 0, 1, 2 and 3, respectively, are allocated to receiver node subsets 0, 1, 2 and 3. Thus, each home node can be configured to direct requests only to receiver nodes in the appropriate subset, thereby significantly decreasing complexity (as compared against FIG. 2), and correspondingly reducing complexity in the interconnect. Alternatively, each receiver node may be allocated to a specific home node, such that each home node can be configured to direct requests only to its specific home node(s).

The address allocation is particularly advantageous if the number of clusters is a power of 2 (including 1, i.e. $2^0$), and each cluster contains the same number of home nodes. This means that the aforementioned advantages of a power-of-two-home-nodes system (i.e. near-even distribution of addresses, reduced congestion in the interconnect, and full usage of home node caches) can be achieved, even in a system with a non-power-of-two number of home nodes. This significantly improves the flexibility and scalability of the system.

In an example, the first-level hash (to identify the cluster to which a given request should be directed) is a log 2(C) bit hash, where C is the number of clusters. If the number of clusters is 1, this step can be skipped.

This has may be as follows, for address A:

Cluster[1:0]=$A[47:46]\^A[45:44]\^A[43:42]\^ \ldots \^A[9:8]\^A[7:6]$

This therefore achieves the mathematical advantages of the above-described hash, regardless of whether the number of home nodes is a power of 2.

In this example, prior to performing the second-level hash (to identify a particular home node within the identified cluster), the address may be modified to remove bits A[6+log 2(C)−1:6], to remove bias of the first level hash. In an example system, this has the effect of removing from the address the bottom log 2(C) bits above the relevant cache line. Performing this removal can prevent holes from being introduced in the memory or home node caches.

The second-level hash can then be performed as a mod function on the modified address using a has with a sufficiently large number of bits.

In an example in which 2 million addresses are provided within the home node clustering scheme of FIG. 3, the distribution of memory addresses is shown in the following table. This is compared against the distribution of memory addresses if a simple power-of-two hash, such as that described above, were applied.

| Home node | % of addresses (FIG. 3 hierarchical hash) | % of accesses (power-of-two hash) |
|---|---|---|
| HN0 | 5.00485% | 6.25% |
| HN1 | 5.0049% | 6.25% |

-continued

| Home node | % of addresses (FIG. 3 hierarchical hash) | % of accesses (power-of-two hash) |
|---|---|---|
| HN2 | 5.0049% | 6.25% |
| HN3 | 5.0049% | 6.25% |
| HN4 | 4.980% | 6.25% |
| HN5 | 5.00485% | 6.25% |
| HN6 | 5.0049% | 6.25% |
| HN7 | 5.0049% | 6.25% |
| HN8 | 5.0049% | 6.25% |
| HN9 | 4.980% | 6.25% |
| HN10 | 5.00485% | 6.25% |
| HN11 | 5.0049% | 6.25% |
| HN12 | 5.0049% | 3.125% |
| HN13 | 5.0049% | 3.125% |
| HN14 | 4.980% | 3.125% |
| HN15 | 5.00485% | 3.125% |
| HN16 | 5.0049% | 3.125% |
| HN17 | 5.0049% | 3.125% |
| HN18 | 5.0049% | 3.125% |
| HN19 | 4.980% | 3.125% |

It can be seen that the presently-described hierarchical hashing scheme provides significantly more even distribution of addresses, with a commensurate reduction of congestion in the interconnect and increased efficiency of operation.

Figure 4:
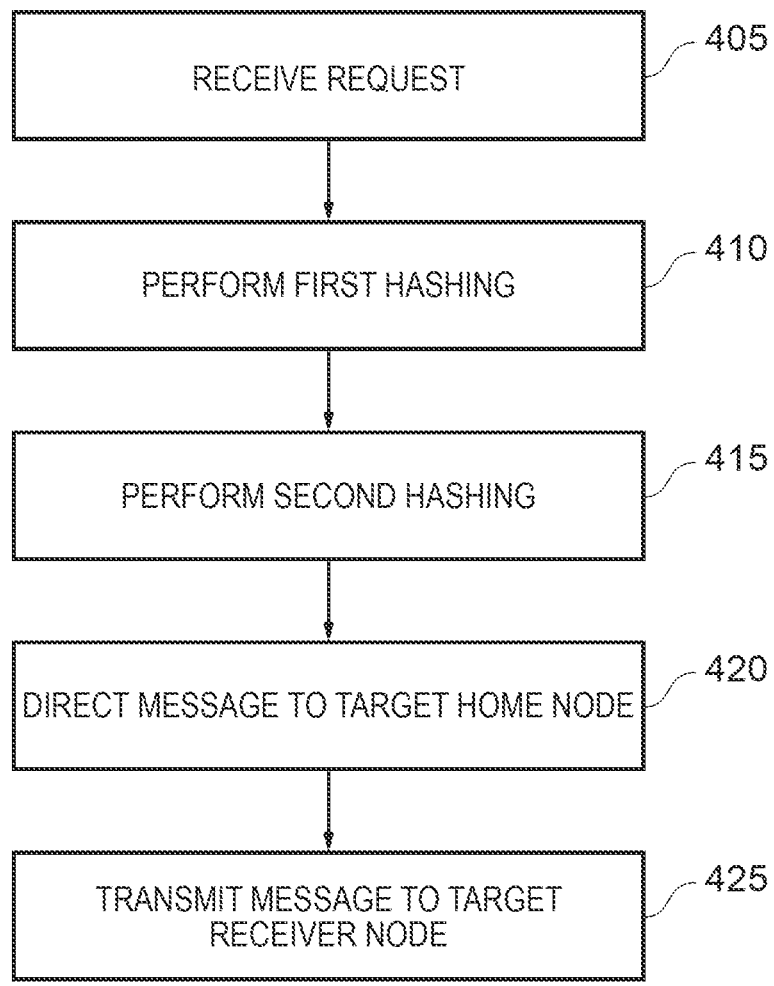
FIG. 4 depicts a method according to an example.

FIG. 4 schematically depicts a method 400 according to an example of the present disclosure. The method may for example be implemented within the interconnect 105 of FIG. 1.

At block 405, a request is received from a home node device. The request is directed to a target receiver node device, and comprises a target address associated with the receiver node device.

At block 410, a first hashing of the target address is performed, to determine a target cluster of home nodes. The target cluster is one of a plurality of clusters of home nodes.

At block 415, a second hashing of the target address is performed, to determine a target home node within the target cluster.

At block 420, the message is directed to the target home node.

At block 425, the message is transmitted from the target home node to the target receiver node device.

Apparatuses and methods are thus provided for clustering home nodes of an interconnect, in order to allow a near-even distribution of addresses across the home nodes by way of a two-level hierarchical hashing scheme. From the above description it will be seen that the techniques described herein provides a number of significant benefits. In particular, the advantages can be achieved in systems with a non-power-of-two number of home nodes as well as a power-of-two number of home nodes (and, similarly, with a non-power-of-two number of receiver nodes as well as a power-of-two number), and the described systems are scalable to arbitrarily large numbers of requester nodes, home nodes and receiver nodes.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:
1. An interconnect apparatus comprising:
a first plurality of interfaces to communicate with respective requester node devices;
a second plurality of interfaces to communicate with respective receiver node devices;
a plurality of home nodes, each home node being configured to:
receive requests from one or more requester node devices via respective interfaces of the first plurality, each request comprising a target address corresponding to a target receiver node device of said second plurality; and
transmit each said request to the corresponding target receiver node device via the respective interface of the second plurality, and
mapping circuitry to:
associate each of said plurality of home nodes with a given home node cluster of one or more home node clusters;
perform a first hashing of the target address of a given request, received at an interface of the first plurality, to determine a target cluster of said one or more home node clusters;
perform a second hashing of the target address, to determine a target home node within said target cluster; and
direct the given message, from said interface of the first plurality, to the target home node.

2. An apparatus according to claim 1, wherein:
the mapping circuitry is further configured to associate each of said receiver node devices with a given home node cluster of said one or more home node clusters; and
said target cluster is the cluster associated with the target receiver node device of the given request.

3. An apparatus according to claim 1, wherein the number of clusters of said one or more home node clusters is an integer power of 2.

4. An apparatus according to claim 1, wherein the mapping circuitry is configured to associate an equal number of home nodes with each cluster.

5. An apparatus according to claim 1, wherein the number of clusters, of said one or more home node clusters, is based on the number of receiver nodes of said second plurality.

6. An apparatus according to claim 5, wherein the mapping circuitry is configured to determine the number of clusters to localize network traffic to the receiver node devices.

7. An apparatus according to claim 1, wherein the mapping circuitry is configured to skip the first hashing responsive to the number of clusters, of said one or more home node clusters, being equal to one.

8. An apparatus according to claim 1, wherein the mapping circuitry is configured to perform the first hashing as a log 2(C)-bit hash of the target address, where C is the number of clusters of said one or more home node clusters.

9. An apparatus according to claim 1, wherein the mapping circuitry is configured to, prior to performing the second hashing, correct the target address for bias associated with the first hashing.

10. An apparatus according to claim 9, wherein said correcting comprises removing at least one bit from the target address.

11. An apparatus according to claim 10, wherein said removing comprises removing log 2(C) bits, where C is the number of clusters of said one or more home node clusters.

12. An apparatus according to claim 10, wherein said removing comprises selecting bits for removal based on at least one of:
the number of clusters of said one or more home node clusters; and
a storage element size associated with the apparatus.

13. An apparatus according to claim 12, wherein said removing comprises:
selecting a least significant bit based on the storage element size;
selecting a most significant bit based on the number of clusters of said one or more home node clusters; and
removing bits comprising the most significant bit, the least significant bit, and each bit between the most significant bit and the least significant bit.

14. A system comprising:
a first plurality of requester node devices;
a second plurality of receiver node devices, wherein the requester node devices are configured to transmit requests, each request comprising a target address corresponding to a target receiver node device of said second plurality; and
an interconnect device, communicatively coupled to the first plurality of requester node devices and to the second plurality of receiver node devices, the interconnect device comprising:
a plurality of home nodes, each home node being configured to:
receive requests from one or more requester node devices; and
transmit each said request to the corresponding target receiver node device via the respective interface of the second plurality, and
mapping circuitry to:
associate each of said plurality of home nodes with a given home node cluster of one or more home node clusters;
perform a first hashing of the target address of a given request, to determine a target cluster of said one or more home node clusters;
perform a second hashing of the target address, to determine a target home node within said target cluster; and
direct the given message to the target home node.

15. An system according to claim 14, wherein:
the mapping circuitry is further configured to associate each of said receiver node devices with a given home node cluster of said one or more home node clusters; and
said target cluster is the cluster associated with the target receiver node device of the given request.

16. A system according to claim 14, wherein at least one of said first plurality of transmitter nodes comprises processing circuitry.

17. A system according to claim 14, wherein at least one of said second plurality of receiver nodes is a memory node.

18. A system according to claim 14, wherein the number of receiver nodes in the second plurality is not an integer power of 2.

19. A system according to claim 14, wherein the number of home nodes in said plurality of home nodes is not an integer power of 2.

20. A method comprising:
receiving, at each home node of a plurality of home nodes, requests from one or more requester node devices via respective interfaces of a first plurality of interfaces, each request comprising a target address corresponding to a target receiver node device;
transmitting each said request to the corresponding target receiver node device via a respective interface of a second plurality of interfaces;
associating each of said plurality of home nodes with a given home node cluster of one or more home node clusters;
performing a first hashing of the target address of a given request, received at an interface of the first plurality, to determine a target cluster of said one or more home node clusters;
performing a second hashing of the target address, to determine a target home node within said target cluster; and
directing the given message, from said interface of the first plurality, to the target home node.

* * * * *